March 26, 1940. S. A. REED Re. 21,411
DEVICE FOR REINFORCING TIRE BEADS AND THE LIKE
Original Filed March 13, 1936
Fig. 1.
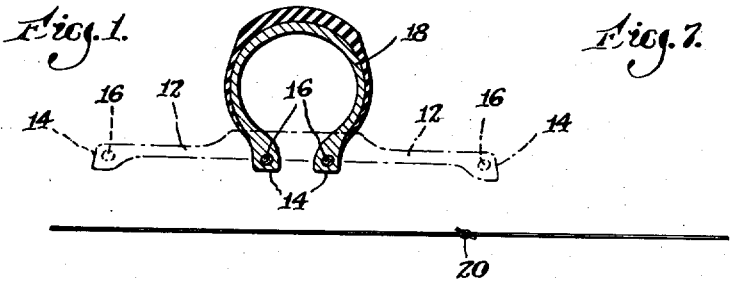
Fig. 7.
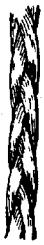
Fig. 2.
Fig. 6.
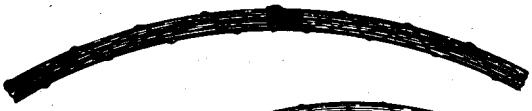
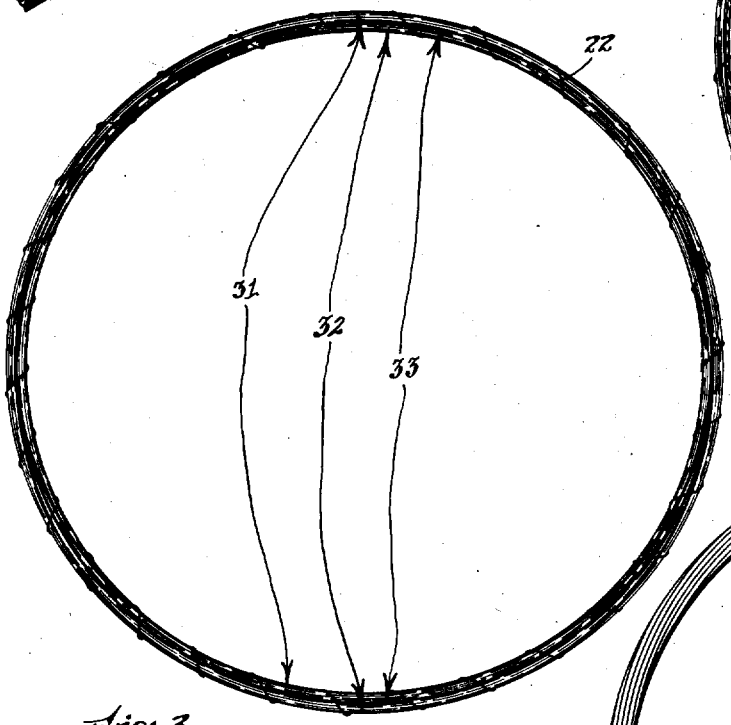
Fig. 3.
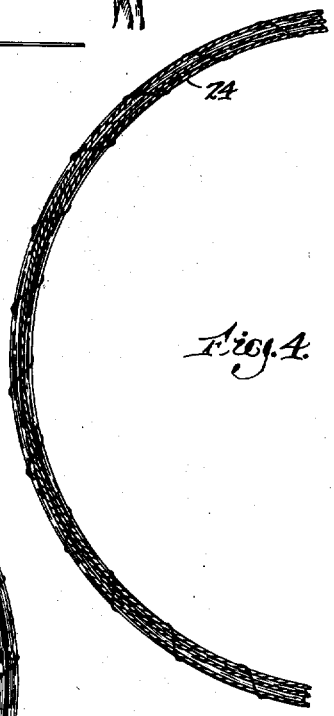
Fig. 4.
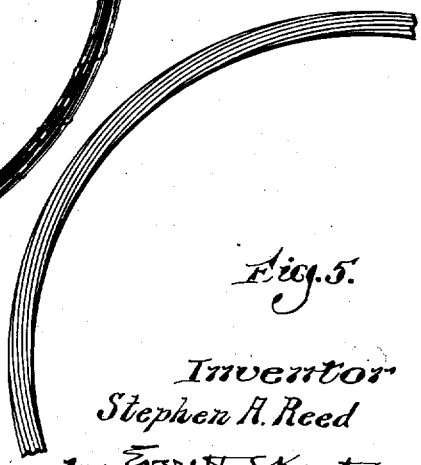
Fig. 5.
Inventor
Stephen A. Reed
by Everett C. Kent
attorney Reissued Mar. 26, 1940

Re. 21,411

UNITED STATES PATENT OFFICE 21,411

DEVICE FOR REENFORCING TIRE BEADS AND THE LIKE

Stephen A. Reed, Duxbury, Mass., assignor to Plymouth Cordage Company, Plymouth, Mass., a corporation of Massachusetts Original No. 2,081,096, dated May 18, 1937, Serial No. 68,622, March 13, 1936. Application for reissue April 22, 1939, Serial No. 269,475

10 Claims. (Cl. 152—362)

This invention relates to improvements in devices for reenforcing tire beads and the like.

More particularly it relates to strengthening the beaded edges of rubber pneumatic tires.

In place of wires, such as heretofore have been used, the invention provides fibrous gromets.

A much higher degree of flexibility is attained by the invention, without sacrificing needed strength and durability. Also the gromets of the invention are, to a degree, self-adjusting in their beds of rubber as the tire is being formed, prior to vulcanization; and thereby an approach is made to equality of distribution of stresses throughout the gromet, tending toward longer effective life and promoting the said superior qualities of flexibility and durability throughout the period of that longer life.

At present, when rubber tire beads are reenforced by embedded steel wires, the necessary treating of those wires for protection against corrosion, by coating them first with tin, and then with copper or zinc to cover pin holes left in the first coating, adds substantially to the cost of the reenforcement. Also, as the metal of such wires undergoes slight flexings when running under load, resulting fatigue of the metal finally causes its breakage.

The invention avoids all corrosion, and all breakage due to fatigue, because it permits the avoiding of corrodible and fatigable materials.

The reenforcement is provided in the form of a gromet, in which multiple convolutions of fibre are assembled together in dimensions of predetermined diameter and thickness, and wherein the convolutions may become adjusted, relative to each other, within the thickness of the gromet, so as to accommodate the stresses that would arise from the contortion of the tire during its formation, without imposition of serious unequal stresses on the individual convolutions.

It is an important feature that my improved devices embodying their various features of superiority, may be produced at a cost which compares favorably with the cost of the prior steel wire devices.

The invention attains these various results by a particular organization which is herein illustrated as being made of hard vegetable fibres, examples of which are manila, hemp, sisal, and other kinds of fibre known as "hard fibre" in the cordage industry. Such fibre, in addition to being strong and durable, is flexible to an extent which permits of its undergoing an interminable number of the mild bendings of a tire bead, without fatigue. It is not subject to corrosion.

By contrast with the wire hitherto used, which is available in great lengths, vegetable hard fibre materials vary between a few inches and a few feet in individual length, much less than is needed for the total of fibre convolutions in one gromet.

The fibre gromet may embody individual fibres tied into one continuous ligament, formed into a succession of convolutions.

Or, it may embody a sliver of fibres, known as roping, which may be formed into a gromet having a series of convolutions of the sliver. If wound in this manner, the ends of sliver may either be butted together, or the sliver ends may taper off and overlap, with individual fibres ending progressively around the gromet, held in place by a serving of cotton thread or the like which maintains the convolutions of sliver in a compact state, suitable for embodiment in a tire bead.

In another form, a spun thread or yarn of fibre may constitute a continuous ligamentary element, which may be wound in the required number of convolutions. The group of convolutions may be held together by a serving; or they will hold themselves together if this group of convolutions be slightly twisted so that they extend helically in the gromet.

Still another form has a ligamentary element made of braided fibres, the said element having the desired number of convolutions which may be maintained in gromet form by either method.

For any particular gromet, all the convolutions have approximate uniformity of circumferential length, and they are assembled so that the mass of them may be rotated about the median circular line, being a sort of circular axis, of the gromet without introducing serious inequalities of tension among the fibres.

It is intended that the patent shall cover, by suitable expression in the appended claims, whatever features of patentable novelty exist in the invention disclosed.

In the accompanying drawing:

Figure 1 is an elevation of a cross-section of a vehicle tire, embodying the invention, showing, in dotted outline, the flat shape of an intermediate stage of production, and showing in full lines the final bulged shape of the tire;

Figure 2 is an elevation showing two fibres knotted together;

Figure 3 is an elevation showing a fibre gromet embodying features of the invention, certain convolutions of the fibre being emphasized by heavy lines for clearness, and to facilitate description;

Figure 4 is a view similar to Figure 3, but with part broken away, showing a continuous spun fibre ligament organized in gromet form;

Figure 5 shows another organization of spun fibre ligament, requiring no serving of thread for maintaining the gromet shape;

Figure 6 is a fragmentary elevation showing roping organized in gromet form; and Figure 7 is a similar view of a braided gromet structure made of roping.

Referring to the drawing, Figure 1 represents, somewhat diagrammatically, an ordinary pneumatic vehicle tire in process of formation. Initially, when assembled on the usual collapsible drum (not shown), the tire has, in cross-section, approximately the form shown in dot and dash outline at 12 in Figure 1. The tire beads are represented at 14, 14; and the reenforcing devices of the invention are indicated at 16, 16.

At this stage 12 the rubber of the tire is in a plastic unvulcanized state, and the tire will be converted to final bulged shape before being vulcanized.

The reenforcing devices with which the invention is concerned are already in their respective beads 14, 14, when the stage 12 of Figure 1 is reached. During the conversion from shape 12 to the final tire shape 18, by the tread portion being made to bulge to the full line position, 18, each bead 14 is made to rotate a quarter-turn about the circular axis of its own mass. That is, the side of each bead, which faces downward in the spread dotted position 12, goes through a quarter turn as the two beads are drawn toward each other to their ultimate positions in the final tire shape 18, where the same part is facing laterally. The executing of this step contains elements of danger of introducing serious inequalities of stresses into the reenforcing device, affecting its strength, durability and flexibility. For example, if the ligamentary element were to consist of single fibres knotted endwise together and wound in ordinary spool style to build up a mass having that thickness which is represented in the various figures of the drawing, in radial direction from the axis of the tire, the shifting of the inmost convolution to a position where its radius is enlarged by a distance equal to half the thickness of this mass of fibre, would involve the providing of means to lengthen it very considerably; and the converting of a convolution which already had this latter mentioned length to a position where the circumferential distance in the tire available for its occupancy is similarly less, would involve a relieving of that convolution from stress; and altogether there would be both the danger of breaking the stretched convolution of fibre and the danger of kinks and loss of tension in those which have to move into a shorter position.

The present invention contrives to embody in the improved gromet a capacity for internal self-adjustment during the said quarter-turning, tending to preserve equality of distribution of stresses throughout its fibre structure. It does this in addition to its organizing of the individual ligamentary elements into gromets which can serve admirably all of the functions required of tire bead reinforcing devices, in that it provides needed strength and couples this with flexibility and durability which surpass the experience that has been had with prior reenforcing devices, such as the double-coated steel wire.

To accomplish these results one may make the gromet by assembling a multiplicity of convolutions of fibre, all with approximate uniformity of diameter. In one form, a continuous ligament is made of hard vegetable fibres joined endwise together by knots. Fibres thus knotted are commercially available, so expertly tied together that the knots are inconspicuous. In Figure 2 a fragment of such a knotted fibre ligament is indicated, the diameter of fibre and of the knot 20 being necessarily exaggerated. Figure 3 shows such a knotted fibre ligament formed into a gromet, wherein the single ligament is wound in multiple convolutions approximately equal to each other in diameter, and therefore in circumferential length. While they are loose, they can be jostled into any desired shape of cross-section of their mass, as, for example, into the circular cross-section pictured. If a particular convolution has a location at the top of the mass, where that mass passes at the upper portion of the tire, that same convolution would lie in the top part of the space occupied by the mass where that mass passes at the diametrically opposite lower portion of the tire, being thus eccentric to the tire. On this principle, each of the convolutions can be shifted in location, in the space occupied by the general mass of the fibres which constitute the reenforcing device, without the length or tension of that convolution being changed. When the quarter turn occurs each fibre can slip sidewise past its neighbors if it happens to be in a location where the quarter turning is eased by its moving. The shifting of all convolutions in this way, according to need, constitutes an automatic readjustment, without introducing serious inequalities of stresses and tension. Conveniently, the uniformity of diameter is attained if the ligament be wound in a single layer with the convolutions laid close together and side by side on a drum (not shown) whose diameter corresponds to the desired medial diameter of the gromet. When a desired number of convolutions have been thus wound on the drum, sufficient for making a gromet of required mass, the convolutions may be slipped from the drum, the respective ends of the ligament being meantime held against circumferential movement. Then the convolutions may be organized together in the gromet form, and if this be a torus, as illustrated, the attained form can be held by a serving of thread 22. In this organizing, all convolutions being equal in diameter, most of them assume positions eccentric to the axis of the tire, a convolution which is high at the top of Figure 3, for example, being also high at the bottom of this figure, as indicated by the single fibre 31 which is drawn in a heavier line for making its position distinguishable. The heavy line 32 shows the location of another eccentric convolution; and heavy line 33 shows the location of one whose eccentricity is zero, i. e., of one which is concentric.

When such a gromet is enclosed in a tire bead which is not yet vulcanized, the individual convolutions can adjust themselves as the bead experiences the quarter turn in being drawn into tire shape, because no convolution needs to change its length, but only to slip to a higher or lower eccentric position in its group.

Figure 4 shows this same general scheme, but the ligament 24 is a spun thread or yarn of fibre; and these yarns are free to slip past each other as to their positions of eccentricity. And Figure 5 shows a spun thread or yarn organized in a gromet with convolutions having slight twist together, and requiring no serving of thread for maintaining the gromet form.

Instead of being convolutions of single fibres, the gromets may be made of groups of fibres known as yarns or roping, such as is portrayed in Figures 6 and 7. In Figure 6 convolutions of a non-twisted sliver, called roping, sufficient in size and number to give a desired thickness of gromet, for example four to six, are organized together on the theory of Figure 3. The fibres may be held by friction upon each other rather than being tied; but they are illustrated with a serving of thread to preserve the gromet form.

Similarly a braided fibre ligament may be organized in convolutions, the group of which may be served with thread for maintaining the gromet form. A fragment of such a braided ligament is represented on an enlarged scale in Figure 7, the length of jaw of braid being minimized in the figure for convenience of showing.

Approximate uniformity of convolutions being the aim, the quarter-turning will not demand a lengthening of any convolution, but only a change of its position relative to others.

The term "ligament" is used herein for the fibrous bundles by analogy to anatomical ligaments, which are bundles of fibres; also, for convenience and not without some degree of analogy, it is applied herein to a strong linear continuity of single fibres.

I claim as my invention:

1. An annular reenforcement, for being embedded in material which has to undergo stresses, comprising an annular group of hard vegetable fibres wherein individual fibres are secured together to provide a single ligamentary element; and wherein the said ligamentary element is organized in a plurality of closely associated convolutions, of which each convolution has approximately the same length as each other, and each has sufficient length for a shifting of its location around the medial circular line of the annular group.

2. A reenforcement for a tire bead comprising a gromet made of hard vegetable fibre wherein individual fibres are secured together to provide a single ligamentary element; and wherein the said ligamentary element is organized in a multiplicity of eccentric convolutions, of which each convolution has approximately the same length as each other, and each has sufficient length for relative movement to effect a mutual shifting of their locations around the medial circular line of the gromet.

3. A reenforcement for a tire bead comprising a gromet made of hard vegetable fibre wherein the individual fibres are secured together, end to end, to provide a single ligamentary fibre element; and wherein the said ligamentary element is organized in a multiplicity of successive convolutions, of which each convolution has approximately the same circumferential length as each other convolution.

4. A reenforcement for a tire bead comprising a gromet made of fibre wherein a group of individual fibres laid together side by side are secured together by being twisted to provide a single ligamentary element of spun-fibre; and wherein the said ligamentary element is organized in a multiplicity of convolutions, of which each convolution has approximately the same circumferential length as each other.

5. A reenforcement for a tire bead comprising a circular group of hard vegetable fibres wherein the individual fibres are organized in a ligament having a multiplicity of fibres and a plurality of convolutions; said group ligament having its two ends tapering with the ends of individual fibres being located at random in the region of tapering; and the fibres are restrained from endwise slippage relative to each other by being sidewise and frictionally engaged against neighboring fibres.

6. A reenforcement for a tire bead comprising a gromet made of hard vegetable fibre organized in roping form, wherein a plurality of thicknesses of the roping are grouped together to make the gromet, and wherein by a gradual tapering of its ends the roping avoids pronounced departures from uniformity of thickness of the gromet.

7. In a pneumatic tire structure having annular beaded edges, a reenforcing device for a said beaded edge, comprising a gromet made of a ligament of hard vegetable fibre organized in a plurality of convolutions, of which each convolution has approximately the same circumferential length as each other, and wherein each convolution is free to shift its position relative to other convolutions within the gromet when the gromet is located within the tire bead and is being rotated therewith while the tire is being converted from flat to rotund cross section prior to vulcanization.

8. An annular body for resisting tensile stress, comprising a fibrous ligamentary structure, in which the component fibres are organized into a continuity which is arranged in a multiplicity of convolutions that are continuous with each other and are grouped together in an annular mass of compact cross section in which each convolution has the same length as each other convolution of that mass, within an approximation of equality of length close enough to adapt the convolutions for a shifting of their several locations around the medial circular line of the group.

9. A tensile reenforcement for a tire bead comprising a flexible ligamentary mass in gromet form composed of a multiplicity of mutually eccentric ligamentary convolutions each of which convolutions has the same length as each other of them within an approximation to equality of length close enough to adapt the convolutions for a shifting of their several locations around the medial circular line of the group.

10. In a pneumatic tire structure having annular beaded edges, a reenforcing device for a said beaded edge, comprising a gromet made of a strong and flexible ligamentary element organized in a plurality of convolutions, of which each convolution has approximately the same circumferential length as each other, and wherein each convolution is free to shift its position relative to other convolutions within the gromet when the gromet is located within the tire bead and is being rotated therewith while the tire is being converted from flat to rotund cross section prior to vulcanization.

STEPHEN A. REED.